United States Patent

Harris et al.

[15] 3,675,150

[45] July 4, 1972

[54] INTERNAL MODULATION OF INJECTION LASERS USING ACOUSTIC WAVES

[72] Inventors: Erik P. Harris, Yorktown Heights; Eric G. Lean, Mahopac; Carl G. Powell, Yorktown Heights, all of N.Y.

[73] Assignee: International Business Machines Corporation, Armonk, N.Y.

[22] Filed: June 30, 1970

[21] Appl. No.: 51,110

[52] U.S. Cl............................................331/94.5, 350/161
[51] Int. Cl..................................................H01s 3/00
[58] Field of Search..................................331/94.5; 350/161

[56] References Cited

UNITED STATES PATENTS

| 3,530,400 | 9/1970 | Pratt, Jr. et al. | 331/94.5 |
| 3,245,002 | 4/1966 | Hall | 331/94.5 |

OTHER PUBLICATIONS

Nathan, Marshall I., et al., " Injection Lasers: State of the Art." Electronics, Dec. 6, 1963. pp. 61–65.
Lasher et al.: " Injection Laser," IBM Tech. Disc. Bull. Vol. 8, pp 118–119, June, 1965.

*Primary Examiner*—Ronald L. Wibert
*Assistant Examiner*—Edward S. Bauer
*Attorney*—Hanifin and Jancin and Jackson E. Stanland

[57] ABSTRACT

An injection laser whose light output is spatially modulated by internal effects in the active region of the laser. An acoustic wave is launched into the laser and is existent only in a small area including the active region of the laser. In low acoustic frequency operation, the acoustic wave is steered over an angle $\theta$ to cause the laser light output to be steered through this angle. In high frequency operation, the frequency of the acoustic wave can be changed to steer the light output, or the acoustic wave can be steered to cause light deflection, as in the low frequency case. The acoustic wave causes phase modulation and loss modulation which results in scanning of the light output. The acoustic wave can be a surface acoustic wave, a Love wave, or a Stonley wave.

17 Claims, 6 Drawing Figures

Patented July 4, 1972

3,675,150

INVENTORS
ERIK P. HARRIS
ERIC G. LEAN
CARL G. POWELL

BY J. E. S*[signature]*

AGENT

INTERNAL MODULATION OF INJECTION LASERS USING ACOUSTIC WAVES

BACKGROUND OF THE INVENTION

1. Field of the Invention

This invention relates to an injection laser, and more particularly to an injection laser whose light output can be spatially modulated or mode-locked.

2. Description of the Prior Art

The prior art has recognized that light sources, such as lasers, can be internally or externally modulated. By internal modulation, it is meant that the light emitting medium is changed in some way to produce a modulated light output, while external modulation refers to a change in a material device different than the active medium which produces the light.

An example of an internal modulation technique is that of changing the current that is used to pump an injection laser. This current may be changed to values above and below threshold, to cause laser output or to stop laser output, respectively. An example of an external modulation scheme is that where the output of the injection laser enters a Bragg cell where it is deflected and frequency modulated due to interaction with an acoustic wave in the Bragg cell. Here, modulation is produced by a device (Bragg cell) separate from the light producing medium.

In general, it would be very desirable to provide an injection laser whose light output can be spatially modulated (scanned) over a relatively wide angle in a continuous fashion. By this it is meant that the light output would always be present, but its direction could be changed. Also, it is desirable that the internal modulation scheme for spatial modulation be one in which the signal on the pumping electrode to the injection laser is not changed in any way. That is, it is desirable to have the modulation control separate from the pumping means.

Internal modulation of a laser by acoustic waves is known. These schemes use bulk acoustic waves which travel through the entire volume of the laser, and provide FM modulation. However, spatial modulation is not possible by this technique. In addition, a large amount of input acoustic power is required, since the acoustic wave is propagated through the entire volume of the laser.

Although there are known techniques available for internally modulating an injection laser, the only one which provides spatial modulation is that which employs a group of electrodes at various locations on the injection laser. In order to spatially modulate the laser, bias is applied in a sequential manner to different electrodes. Lasing action occurs only where there is an injection current into the laser and, therefore, a laser output will appear only from those regions where a signal is applied to an electrode. Necessarily, this is not a continuous light output, since the light will be turned on and off in accordance with the occurrence of bias pulses at the electrodes. Further, this electrode-group technique for spatially modulating an injection laser has the disadvantage that the modulation signal is applied (and is coincident with) the actual pumping signal rather than being separate from it.

Accordingly, it is a primary object of this invention to provide an injection laser whose output can be spatially modulated in a continuous fashion.

It is another object of this invention to provide an injection laser whose output can be spatially modulated by a control signal separate from that which is used to pump the injection laser.

It is still another object of this invention to provide an injection laser whose output can be mode-locked in a new and improved manner.

It is a further object of this invention to provide an injection laser which is efficiently modulated and requires low power modulation signals.

BRIEF SUMMARY OF THE INVENTION

This injection laser has a light output which can be spatially modulated and also mode-locked. Internal modulation of the light output from an injection laser is achieved by a spatially non-uniform acousto-optic effect in the laser medium. This effect is induced by acoustic waves which are confined to the region of the junction plane (active region) of the injection laser.

An injection laser contains a junction plane separating regions of opposite conductivity. Passage of current across the junction produces radiative recombinations and, if the gain is sufficient, stimulated light outputs will occur. This phenomenon is well known and is explained in more detail in U.S. Pat. No. 3,265,990, assigned to the same assignee as the present invention.

Located on the injection laser is a transducer, or plurality of transducers, for launching an acoustic wave into the injection laser. The acoustic wave is confined to the region of the junction plane of the laser. In a particular case, the acoustic wave is a surface acoustic wave. Other embodiments will employ Love waves and Stonley waves.

Attached to the transducer means is a means for changing the direction of the acoustic wave in the injection laser. This means is comprised of conventional equipment, such as voltage sources, phase shifters, frequency changers, etc., and, together with the transducers, comprises a means for launching a steerable acoustic wave in the injection laser. If required, the frequency of the acoustic waves can be changed for light scanning.

Both phase modulation and loss modulation are used to provide scanning of the output laser beam. By loss modulation it is meant that there is a change in the waveguide properties of the active medium of the laser, the change being brought about by localized changes in the index of refraction and the gradient of the index of refraction in and near the active region. Contrary to prior art bulk acoustic wave modulators, the acoustic waves used here provide gradients in the index of refraction both across the active region and through its depth. The laser medium will have its highest gain in a direction normal to the direction of propagation of the acoustic wave. Phase modulation refers to the fact that the acoustic wave will produce different changes in index of refraction in the active region as it propagates through the laser. The phase velocity of light will be different in different portions of the laser and this will lead to diffraction effects.

Two modes of operation are possible for providing a spatially modulated laser output. The first is a low frequency operation, where the acoustic wave must be steered in order to provide spatial modulation of the light output. This low frequency operation is that which occurs for an acoustic wave frequency of about 30 MHz to 100 MHz. That is, there are approximately –10 acoustic wavefronts in the width of the laser for low frequency operation. In this mode of operation, the laser is located in an angularly degenerate cavity which provides light feedback at all angles. If the acoustic wave is steered through an angle $\theta$ with respect to its initial direction, the light output will also be steered through an angle $\theta$.

The angularly degenerate cavity can be provided by using reflecting mirrors on either side of the laser so that light feedback into the active region of the laser is independent of the angle which the light makes with respect to the original axis of the laser. For instance, with a GaAs laser, an angularly degenerate cavity can be provided by either shaping the surfaces of the active medium or by using external mirrors of a proper design. Such cavities are well known, as can be appreciated by reference to R. V. Pole's paper on "Conjugate — Concentric Laser Resonator" printed in Journal of the Optical Society of America, Vol. 55, No. 3, pp. 254–260, March 1965.

Another mode of operation is termed the high frequency mode. This describes operation of the injection laser with input acoustic frequencies in excess of about 100 MHz. That is, more than 10 acoustic wavefronts can exist in the width of the laser at any time. At higher acoustic frequencies, advantage can be taken of other effects (such as diffraction) to provide two ways to scan the laser light output over an angle. In the first way of scanning, the frequency of the input acoustic wave is changed in order to deflect the laser light output. Since the highest gain of the laser is in a direction normal to the acoustic wave fronts, filaments of light will be produced in this direction. These filaments can be viewed as light sources and, if the acoustic wave frequency is changed, the spatial periodicity of these sources will be changed. This leads to interference effects and the light output will be deflected over an angle.

A second way of providing spatial modulating of the light output of an injection laser in the high frequency mode of operation is that which is used for low frequency spatial modulation. That is, the acoustic wave is steered over an angle $\theta$, causing steering of the light output through an angle $\theta$. The deflection in the case of a steerable acoustic wave is greater than that which can be achieved by merely changing the frequency of the acoustic wave. When the acoustic wave is steered, the primary mechanism causing light scanning is that of loss modulation, since the wave guide properties of the active medium are changed by the acoustic wave. Because certain types of acoustic waves are used, there is a gradient in index of refraction both across the depth of the active region and along its width. It is this effect which distinguishes these devices from the prior bulk wave devices which do not provide spatial modulation. In those prior devices, there is no gradient in index across the active region and along the active region.

Mode-locking is established by providing a standing acoustic wave in the laser medium. This acoustic wave has a frequency that is some multiple of the cavity round-trip frequency of the laser. Mode-locking will produce a laser output consisting of a train of short light pulses.

The foregoing and other objects, features and advantages of the invention will be apparent from the following more particular description of the preferred embodiments of the invention as illustrated in the accompanying drawings.

DESCRIPTION OF THE PREFERRED EMBODIMENTS

Figure 1:
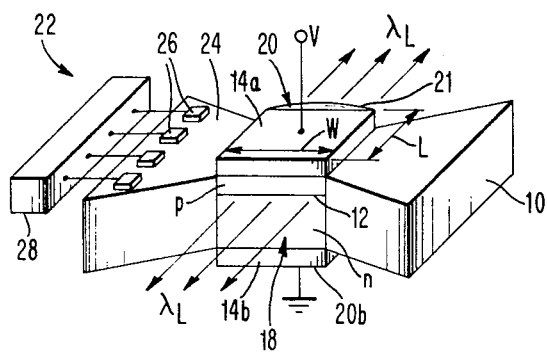
FIG. 1 is a schematic illustration of an injection laser having a spatially modulated light output.

FIG. 1 is an illustration of an injection laser having a light output which can be spatially modulated. For ease of explanation and clarity, the same reference numerals will be used whenever possible. The basic structure of FIG. 1 is that of a conventional injection laser. A semiconductor material 10, such as gallium arsenide, has a p-n junction 12 therein and electrodes 14a and 14b on its top and bottom surfaces, respectively. Electrode 14a is connected to pumping source 16, while bottom electrode 14b is shown attached to ground.

Surfaces 18 and 20 of the laser 22 are coated with a reflecting material, or are cleaved, in order to make them highly reflecting to the light generated within the injection laser. An angularly degenerate cavity, represented by mirrors 21 (only one of which is shown) is provided on surfaces 18 and 20, if these surfaces are not highly reflecting. The cavity 21 provides light feedback into the laser medium which is independent of the angle of propagation of the laser light output, represented by arrows designated $\lambda_L$ (laser wavelength). The mirror 21 on surface 18 is not shown in order to more easily describe other portions of laser 22. The other surfaces of laser 22 are not highly reflecting to the laser light output and therefore the light output ($\lambda_L$) of the laser will be in the direction of the arrows. The frequency of the laser output is a function of the length L of the resonant cavity created by the highly reflecting surfaces 18 and 20.

In the embodiment of FIG. 1, surface acoustic waves are produced near the surface 24 of the injection laser by transducers 26, which are connected to excitation means 28. This means is a voltage source which is generally connected to a phase shifter. Excitation of transducers 26 causes surface acoustic waves to be propagated along surface 24 of the laser. The number of acoustic wavefronts in laser width W is dependent on the frequency of the acoustic waves. The transducers are conventional and could be, for instance, interdigital transducers which are well known. Either one transducer or several can be used.

Due to the differences in free carrier concentrations, absorption edge profiles, and other properties between the junction layer and other regions of semiconductor 10, the index of refraction $n$ of the laser varies in the depth of the layer and with its width W. The junction layer is defined as a thin layer which includes the p-n junction 12, and is generally about 1 micron in thickness. The junction layer is an optical waveguide for confining the laser light. The primary loss mechanisms in the laser are caused by the penetration of light outside the junction layer and by free carrier absorption of the light. Small variations of the index of refraction in the junction layer of the laser can have a pronounced effect on the threshold condition and on the radiation pattern of the laser. The acoustic wave propagating along the surface of the laser causes a gradient in the index of refraction in the junction plane which enhances or reduces the inherent gradient present near the junction 12, thus affecting the waveguide properties of the active region (junction plane). This affects the diffraction losses of the laser.

Figure 2:
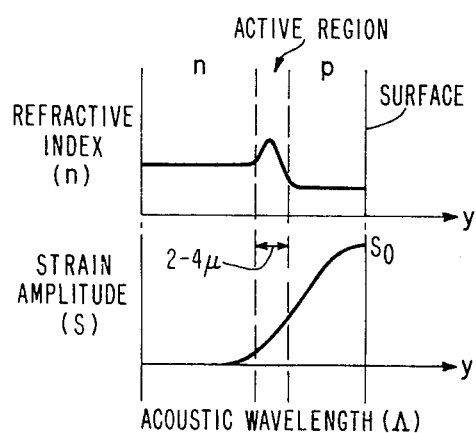
FIG. 2 is a graph showing the variation of the index of refraction across the junction plane of the injection laser of FIG. 1. Also shown in this graph is the variation of strain amplitude required to produce this change in index of refraction.

FIG. 2 illustrates the change in index of refraction ($N$) through the junction plane 12 due to the presence of a propagating surface acoustic wave. The active region (junction layer) is indicated by dashed lines and includes a small region on either side of the p-n junction. The surface acoustic wave induces a strain $S_0$ at the surface of the laser 22, which decays exponentially into the material 10. However, if the junction plane 12 is sufficiently close to the surface of the laser, a strain will exist in a region close to the junction and will cause a gradient in the index of refraction across the junction 12.

As an example of a suitable injection laser, a laser can be made from zinc-diffused gallium arsenide having a junction depth of approximately 1–100 microns. The junction plane thickness would be approximately 1 micron. For 300 MHz surface acoustic waves, the wave decay distance into the laser is approximately 10 microns. If the acoustic wave is approximately 11 watt, the change of index in the junction region will be a few percent. Since the laser active medium is highly non-linear, small changes in the gain of the laser will produce large changes in the laser output. Consequently, for a laser operated near threshold, the excess gain can be significantly modulated.

The pumping current in the injection laser is at least at the threshold value, but can be greater. The magnitude of the pumping current will affect some of the requirements on the acoustic wave, as will be seen below.

The surface acoustic wave has a power of approximately 200 milliwatts. The amount of power in the acoustic wave is related to the change in index needed to cause the desired modulation. As the desired change in index of refraction is increased, greater acoustic power is generally needed. The frequency of the acoustic wave depends on the size of the laser. There must be at least a few wavelengths of the acoustic wave in the laser medium 10 in order to introduce sufficient loss to modulate the laser light output. Since injection lasers are usually approximately 1–20 mils wide (in the direction of the acoustic wave), the frequency of the acoustic wave is generally 30 MHz – 3 GHz.

The junction depth of the laser is defined as the depth from the surface on which the acoustic wave propagates to the p-n junction 12. This depth is limited by the acoustic frequency since, as the acoustic frequency increases, the decay of the acoustic wave into the laser increases. In general, it is desirable to have the junction plane within approximately one quarter of the acoustic wavelength of the surface on which the acoustic wave propagates, in the case of Rayleigh surface acoustic waves.

As a minimum, approximately 10 milliwatts of acoustic power as usually required. As the laser is pumped more hard by the injection current from source 16, it will tend to lase even with losses introduced by the propagation of the acoustic wave. As the laser pumping increases above lasing threshold, additional acoustic power is required to introduce losses sufficient to cause modulation of the laser output. The percentage of change of the index of refraction in order to provide modulation thus depends on the laser pumping level. As the pumping level is increased, the amount of change needed is greater. At low pumping levels (around threshold), only fractional percentage changes in the index of refraction are needed.

OPERATION OF THE LASER

This laser operates in both a high frequency mode and a low frequency mode and provides spatial modulation in each mode of operation. However, in the high frequency mode of operation there are two ways to produce spatial modulation, while in the low frequency operation only one way exists for providing spatial modulation. Initially, the low frequency operation will be discussed and then the two spatial modulation techniques available with high frequency operation will be discussed.

When the acoustic frequency is between 30 and 100 MHz, only a few wavelengths of the acoustic wave exist in the width W of the laser. This means that the number of wavefronts of the acoustic wave in the laser 22 is approximately 1–10. At such low frequency operation spatial modulation is provided by steering the acoustic wavefronts through an angle $\theta$.

Figure 3:
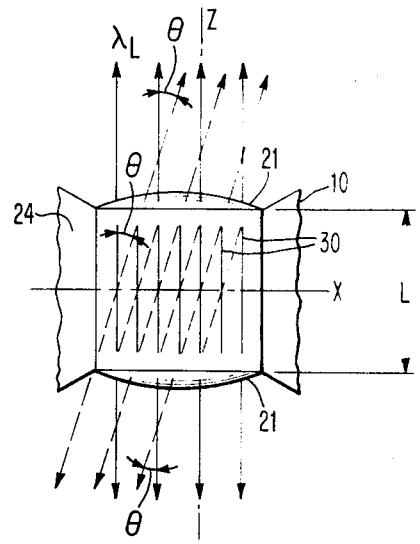
FIG. 3 is a top view of a portion of the injection laser of FIG. 1, in which the effect of a steerable acoustic wave on the laser output is shown.

The effect which occurs when the acoustic wavefronts are steered through an angle is illustrated in FIG. 3. This is a top view of the laser of FIG. 1 in which portions are not shown. For instance, the excitation source 28 and input transducers 26 are not shown. However, this view shows the angularly degenerate cavity 21 more clearly, since both curved mirrors 21 are shown.

The acoustic wavefronts 30 initially propagate in the X direction and are indicated by the solid vertical lines normal to the X direction. When the acoustic wave propagates in this direction, the laser output $\lambda_L$ is in the Z direction, as indicated by the solid arrows. If the acoustic wavefronts 30 are now steered through an angle $\theta$ with respect to their initial direction, as indicated by dashed lines 30, the laser output $\lambda_L$ will also be deflected from the V direction by the angle $\theta$. Thus, complete spatial modulation is achieved by steering the acoustic wavefronts. This is done by conventional means as will be more apparent later.

For the high frequency mode of operation, the frequency of the input acoustic waves is greater than about 100 MHz. That is, more than 10 acoustic wavefronts will exist across the width W of the laser. With the high frequency input acoustic waves, two waves exist for spatially modulating the laser output. One of these is that of steering the acoustic wave, as described above with respect to the low frequency operation. Since this technique is identical to that previously described, it will not be discussed further. It is only necessary to say that, regardless of input acoustic frequency, complete spatial modulation is provided by steering the input acoustic wave. When spatial modulation is provided by steering the acoustic wave, an angularly degenerate cavity is required.

The second way for providing spatial modulation of laser light output at high frequencies is to change the frequency of the acoustic waves, rather than by steering it. Since the angle through which the output light is deflected is a function of the frequency and velocity of the input acoustic wave, changes in this frequency will provide changes in the angle of deflection of the laser output. The acoustic wave will produce changes in the index of refraction of the laser and the phase velocity of light in the laser will be different in different portions of the active region. Therefore, diffraction effects will result and a phase modulation will occur. The light output will then be scanned over an angle dependent upon the amount of frequency change.

The acoustic wave is steered by conventional techniques. For instance, if the frequency or phase of the excitation applied to the transducers 26 is changed, a phased transducer array is provided and the direction of the acoustic wavefronts 30 is changed. This procedure is well known in the antenna art. The excitation means 28 can be an A.C. voltage source connected to a phase shifter or it can be a variable frequency voltage source. Any excitation means which will provide a phased input to the transducers 26 or a frequency changeable input to these transducers will provide a steerable acoustic wave.

Figure 4A:
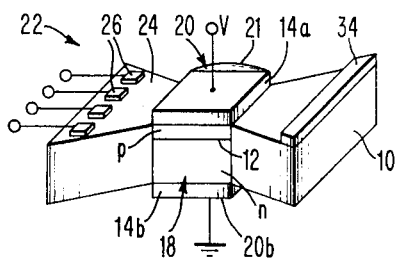
FIG. 4A is an illustration of an injection laser according to this invention, which uses traveling acoustic waves.

FIG. 4A shows an injection laser 22 similar to that of FIG. 1, except that an absorbing medium 34 is located on its top surface. In this drawing, the excitation means 28 is omitted for ease of explanation. The acoustic waves here are traveling surface acoustic waves which are absorbed by the medium 34. This medium is wax or any other soft material such as solder. Acoustic absorbers are well known in the art and any can be used.

Figure 4B:
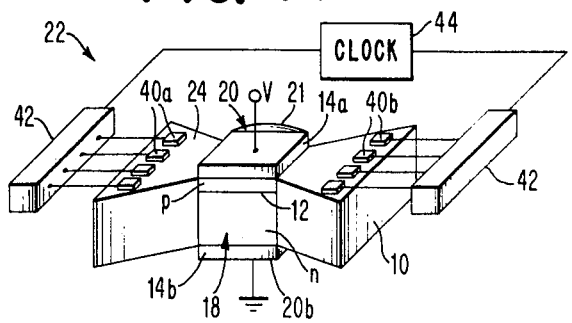
FIG. 4B is an illustration of an injection laser according to this invention which uses standing acoustic waves.

FIG. 4B shows an injection laser similar to that of FIG. 1, except that standing acoustic waves are used to spatially modulate the laser output. As with FIG. 4A, the same reference numerals are used here as were used in FIG. 1.

To create standing acoustic waves near the surface of the injection laser, an input set of transducers 40a and an output set of transducers 40b is employed. These two sets of transducers are driven in timed sequence so that each input transducer will be pulsed at the same time as the corresponding output transducer. In FIG. 4B, two separate excitation means 42 are shown, interconnected by a clock 44 which synchronizes the two means. If desired, the output transducers 40b could be connected to the same excitation means 42 as the input transducers 40a. The rest of the laser 22 is the same as that of FIG. 1 and it operates in the same way. If standing waves are employed, mode-locking is possible. As the acoustic surface wave propagates in the junction plane, the laser has its highest gain in a direction perpendicular to the acoustic propagation vector. In an external cavity, mode-locking is achieved by setting up a standing surface acoustic wave at a frequency equal to some multiple of the cavity round trip frequency. That is, the frequency of the acoustic wave is $nc/2L$, where $L$ is the length of the cavity and $n$ is then 1, 2, 3 .... The standing acoustic wave propagating with wavefronts at an angle $\theta$ with respect to the initial lasing direction will introduce a periodic loss having twice the frequency of the acoustic wave. Light output pulses at a frequency $nc/2L$ (round trip frequency of cavity) are produced.

Figure 5:
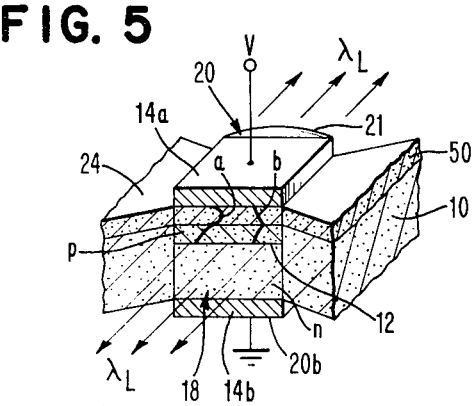
FIG. 5 is a cross-sectional view of an internally modulated injection laser similar to that of FIG. 1, except that either a Love wave $a$ or a Stonley acoustic wave $b$ is used for spatial modulation.

FIG. 5 shows an injection laser which operates similarly to that of FIG. 1. In this drawing, only the active portion of the total laser is shown. It is to be understood that the transducers and portion of semiconductor 10 used to support these transducers are identical to that of FIG. 1. In FIG. 5, either a Love wave $a$ or a Stonley wave $b$ is used as the steerable acoustic wave, rather than a Rayleigh surface wave.

A Love wave is an acoustic wave which propagates in a thin film having a velocity in the film which is less than its velocity in the underlying substrate.

A Stonley wave is an acoustic wave which propagates along the interface between two different media. Both the Love wave and the Stonley wave decay exponentially from the thin film and from the interface, respectively. In FIG. 5, a Love wave, represented schematically by the wave $a$ and a Stonley wave, represented by the wave $b$, are used to spatially modulate the laser light $\lambda_L$, by the same modes of operation described previously.

The laser is the same as that of FIG. 1, with the exception that a thin layer 50 is deposited on top of the laser 22. This layer is any material having a slower shear wave velocity for acoustic Love waves than the velocity of these waves in the underlying laser material 10. In the case of a gallium arsenide injection laser, germanium is suitable for layer 50.

The Ge layer 50 is not needed for the propagation of a Stonley wave, since it could propagate between metal electrode 14a and laser medium 10. Also, if the metal electrode 14a has a shear wave velocity for Love waves less than that of laser material 10, the extra layer 50 is not needed for propagation of Love waves.

As in the case of the laser in FIG. 1, the Love wave or Stonley wave will decay exponentially into the laser. If the junction plane of the laser is sufficiently close to the area of propagation of the acoustic wave, the acoustic wave will cause localized variations in the index of refraction along the junction plane. These variations will in turn induce losses and will cause the light output $\lambda_L$ of the laser to be modulated. As with Rayleigh surface acoustic waves, use of a Love wave or Stonley wave provides very efficient operation and requires smaller power, with less heat dissipation. The requirements with respect to acoustic frequency and power, as well as junction depth and injection current, are essentially the same as those listed for the surface wave laser of FIG. 1. That is, these same basic requirements exist no matter what type of acoustic wave is used.

In the lasers described above, the direction of propagation of the acoustic wave is not critical. That is, the acoustic wave can be directed along many axes and the particular crystal orientation of the laser material is not critical. As will be appreciated by those working in the field of acoustic waves, direction along certain preferred axes may be more favorable. However, the presence of the acoustic waves will cause a gradient in the index of refraction in the active region of the laser, regardless of its direction of propagation through the laser material.

Further, although a zinc-doped gallium arsenide laser has been described, it will be understood by those of skill in the laser art that injection lasers can comprise any III–V materials, as well as II–VI materials. That is, this invention will work properly with any semiconductor injection laser. The principle involved is that of an induced change of index of refraction in the active region of the injection laser, and the particular injection laser employed is not critical.

The principles of this invention are useful for devices of many types. For instance, while spacial modulation and mode-locking has been described, it will be apparent that other uses are possible. For instance, amplitude modulation through induced losses in the active region of the laser is easily provided by the principles described here. In this way, the modulated laser is useful in a variety of technologies, such as light diffraction, display or other optical signal processing devices.

What is claimed is:

1. An injection laser providing a spatially varying light output, comprising:
    a medium of emitting stimulated light when biased with a threshold current, said medium being characterized by a p-n junction plane therein;
    an angularly degenerate optical cavity capable of sustaining laser oscillations in a plurality of angularly related directions in which said medium is located, said cavity providing optical feedback of said stimulated light;
    bias means for providing said threshold current to said medium for causing said stimulated light output;
    means for generating acoustic waves having wavefronts substantially normal to said junction plane and being localized in the vicinity of said junction plane, said acoustic waves producing localized gradients in the index of refraction of said medium, said gradients being normal to said junction plane;
    means for steering said acoustic waves in a plurality of propagation directions through said medium so that when the acoustic waves are steered in a given direction, the laser oscillations are confined to a direction substantially perpendicular to said given direction.

2. The laser of claim 1, wherein said acoustic waves are standing waves.

3. The laser of claim 1, wherein said acoustic waves are Rayleigh surface waves.

4. The laser of claim 1, further including a thin film located on said medium, said acoustic waves being Love waves travelling in said thin film.

5. The laser of claim 1, further including a thin film located on said medium, said acoustic waves being Stonley waves travelling along the interface between said thin film and said medium.

6. The laser of claim 1, where said means for steering includes transducers located on said medium for delivering said acoustic waves to said medium and means for providing variable phase inputs to said transducers.

7. The laser of claim 1, wherein said bias means includes electrodes located on said medium.

8. The laser of claim 7, where said acoustic waves are Love waves which travel in one of said electrodes, the velocity of said Love waves in said one electrode being less than their velocity in said medium.

9. The laser of claim 7, where said acoustic waves are Stonley waves travelling along the interface between said bias electrode and said medium.

10. An injection laser providing a spatially varying light output, comprising:
    a medium capable of emitting stimulated light when biased with a threshold current, said medium being characterized by a p-n junction plane therein;
    optical cavity means in which said medium is located, said cavity means providing optical feedback of said stimulated light in the form of a plurality of parallel light filaments;
    bias means for providing said threshold current to said medium for causing said stimulated light output;
    means for generating acoustic waves having wavefronts substantially normal to said junction plane and being localized in the vicinity of said p-n junction plane, said acoustic waves producing localized gradients in the index of refraction of said medium in a direction normal to said junction plane;
    means for changing the frequency of said acoustic waves to cause spatial scanning of said light output to vary the spatial periodicity and phase velocity of the light filaments which oscillate within the junction causing the output to be scanned.

11. The laser of claim 10, wherein said acoustic waves are surface acoustic waves.

12. The laser of claim 10, having a thin film located on said medium in which acoustic Love waves travel.

13. The laser of claim 10, having a thin film located on said medium, where said acoustic waves are Stonley waves travelling along the interface between said thin film and said medium.

14. The laser of claim 10, where said bias means includes electrodesl connected to said medium.

15. The laser of claim 14, wherein said acoustic waves are Love waves which travel in one of said electrodes, the velocity of said love waves in said one electrode being less than their velocity in said medium.

16. The laser of claim 14, wherein said acoustic waves are Stonley waves travelling along the interface between one of said electrodes and said medium.

17. The laser of claim 10, wherein said acoustic waves are standing waves.

* * * * *